(12) United States Patent
Hatfield et al.

(10) Patent No.: US 11,334,323 B1
(45) Date of Patent: May 17, 2022

(54) INTELLIGENT AUTO-GENERATED WEB DESIGN STYLE GUIDELINES

(71) Applicant: International Business Machines Corporation, Armonk, NY (US)

(72) Inventors: Jennifer M. Hatfield, San Francisco, CA (US); Chris Degnen, Pleasantville, NY (US); Randall Avery Craig, Raleigh, NC (US); Tom Brugler, Fuquay Varina, NC (US); Corey Sonier, Baton Rouge, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/098,862

(22) Filed: Nov. 16, 2020

(51) Int. Cl.
  *G06F 17/10* (2006.01)
  *G06F 8/20* (2018.01)
  *G06F 40/103* (2020.01)
  *G06F 16/958* (2019.01)

(52) U.S. Cl.
  CPC ............. *G06F 8/22* (2013.01); *G06F 16/972* (2019.01); *G06F 40/103* (2020.01)

(58) Field of Classification Search
  CPC ......... G06F 8/22; G06F 16/972; G06F 40/103
  See application file for complete search history.

(56) References Cited

U.S. PATENT DOCUMENTS

| | | | |
|---|---|---|---|
| 9,841,956 B2 | 12/2017 | Bomheimer et al. | |
| 10,423,709 B1* | 9/2019 | Bradley | G06F 40/174 |
| 2002/0156799 A1* | 10/2002 | Markel | G06F 16/958 |
| 2011/0289588 A1* | 11/2011 | Sahai | G06Q 90/00 726/25 |
| 2017/0139564 A1* | 5/2017 | Belekar | G06F 11/3604 |
| 2018/0232340 A1* | 8/2018 | Lee | G06F 40/186 |
| 2019/0042397 A1* | 2/2019 | Vignesh R | G06F 11/3692 |
| 2019/0325626 A1 | 10/2019 | Tao | |
| 2020/0081691 A1* | 3/2020 | Gupta | G06N 3/082 |
| 2020/0133642 A1 | 4/2020 | Payne | |

OTHER PUBLICATIONS

Young, "Ten Living Style Guide Tools for Web Designers—Best of," Apr. 9, 2019, Hongkiat.com (HKDC), accessed Nov. 5, 2020, 7 pages. https://www.hongkiat.com/blog/best-living-style-guide-tools/.

(Continued)

*Primary Examiner* — Shahid K Khan
(74) *Attorney, Agent, or Firm* — Yee & Associates, P.C.

(57) ABSTRACT

Automatically generating web design style guidelines is provided. A set of web design style guideline patterns present in extracted website design and content elements corresponding to a website design build is identified using a cognitive component. The set of web design style guideline patterns is correlated with a set of accessibility rules using the cognitive component. A set of web design style guidelines is automatically generated for the website design build that complies with the set of accessibility rules using the cognitive component based on correlation of the set of web design style guideline patterns with the set of accessibility rules. A recommendation is output for the set of web design style guidelines to be implemented in the website design build using the cognitive component.

20 Claims, 6 Drawing Sheets

(56) References Cited

OTHER PUBLICATIONS

Yoon et al., "Stylify Me—Online Style Guide Generator," accessed Nov. 5, 2020, 2 pages. http://stylifyme.com/.

Karkovack, "Styleguide Toolbox—Templates, UI Kits, Tools & Generators," Jun. 2, 2020, speckyboy.com, accessed Nov. 5, 2020, 8 pages. https://speckyboy.com/styleguide-toolbox/.

Haritonov, "An In-Depth Overview Of Living Style Guide Tools," Smashing Magazine, accessed Nov. 5, 2020, 10 pages. https://www.smashingmagazine.com/2015/04/an-in-depth-overview-of-living-style-guide-tools/.

Eisele et al., "Automated GUI Style Guide Testing," Process Analysis Nr. 6, University of Stuttgart Institute of Software Technology, Oct. 15, 2014, 45 pages. ftp://129.69.211.2/pub/library/medoc.ustuttgart_fi/PROZ-2014-05/PROZ-2014-05.pdf.

* cited by examiner

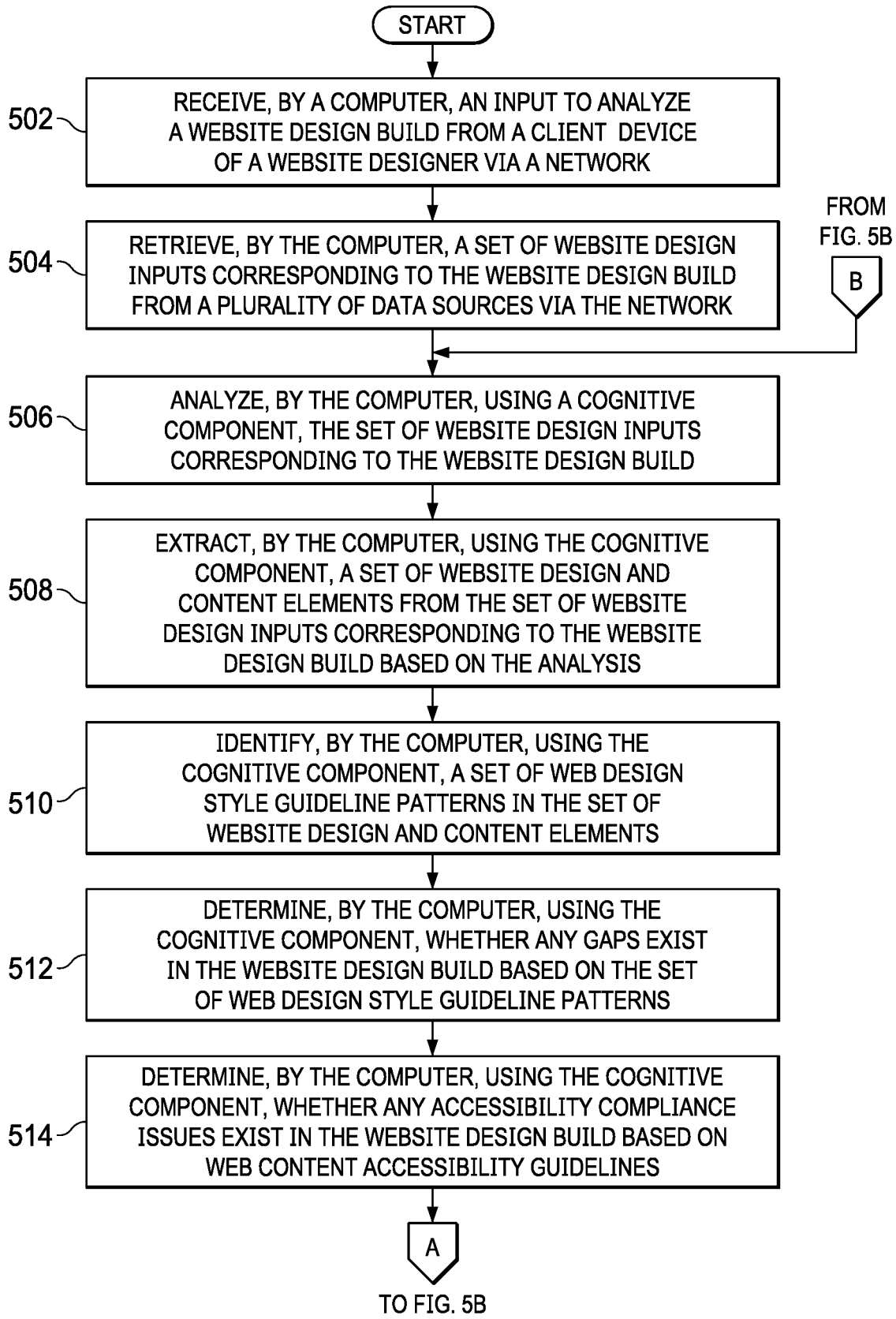

INTELLIGENT AUTO-GENERATED WEB DESIGN STYLE GUIDELINES

BACKGROUND

1. Field

The disclosure relates generally to website design builds and more specifically to automatically generating web design style guidelines for a specified website design build based on identified style guide patterns in existing best practice web design style guideline template examples and determined compliance with accessibility guidelines.

2. Description of the Related Art

Creating websites is getting more and more complex and is usually accomplished by a web development team comprised of website designers and developers. Also, it is important to ensure that the website design is consistent and optimized to meet entity objectives and create an enjoyable user experience. User experience is the overall experience of a person using a website, especially in terms of how easy or pleasing it is to use.

One way to ensure that all members of the web development team have the same understanding of the project when designing separate parts of the website is to create web design style guidelines (i.e., design documentation). Web design style guidelines contain the requirements designers and developers in a collaborative website build project must adhere to in order to have different aspects of the website in synchronization with each other. Some of the elements taken into account when creating a website are, for example, typography, color palette, icons, imagery, copy, graphics, white space, forms, spacing, buttons, and the like. The web design style guidelines provide definitions for the different elements and pages of a website in accordance with brand guidelines of an entity, such as, for example, a company, business, enterprise, organization, institution, agency, or the like. Brand is what an entity stands for or the message the entity is trying to get across to users of the website (e.g., mission, values, and the like). Brand may also include logo, color palette, and other elements corresponding to a particular entity. In other words, entity brand and website design go hand in hand.

Having web design style guidelines is beneficial for creating a cohesive user experience among different webpages of a website. In addition, web design style guidelines ensure that future development or third-party production will follow brand guidelines and will be perceived as part of the overall brand of an entity. Web design style guidelines are a collection of predesigned elements and rules, which designers and developers follow to ensure that separate website pieces will be consistent and will create a cohesive user experience at the end.

User experience is an overarching consideration that involves a wide range of activities by the designers and developers who make decisions and take actions that affect how users experience a website. Every designer and developer on the web development team has a role to play in this. Further, providing a good user experience is a critical factor in the success of any entity with an online presence. Nothing is better for building a loyal customer base than providing a good user experience, where users are successful in accessing and using elements and features of a website.

SUMMARY

According to one illustrative embodiment, a computer-implemented method for automatically generating web design style guidelines is provided. A set of web design style guideline patterns present in extracted website design and content elements corresponding to a website design build is identified using a cognitive component. The set of web design style guideline patterns present in the extracted website design and content elements corresponding to the website design build is correlated with a set of accessibility rules using the cognitive component. A set of web design style guidelines is automatically generated for the website design build that complies with the set of accessibility rules using the cognitive component based on correlation of the set of web design style guideline patterns present in the extracted website design and content elements corresponding to the website design build with the set of accessibility rules. A recommendation is output for the set of web design style guidelines to be implemented in the website design build using the cognitive component. According to other illustrative embodiments, a computer system and computer program product for automatically generating web design style guidelines are provided.

BRIEF DESCRIPTION OF THE DRAWINGS

FIGS. 5A-5B are a flowchart illustrating a process for generating a recommendation to modify a specific type of web design style guidelines in accordance with an illustrative embodiment.

DETAILED DESCRIPTION

Figure 1:
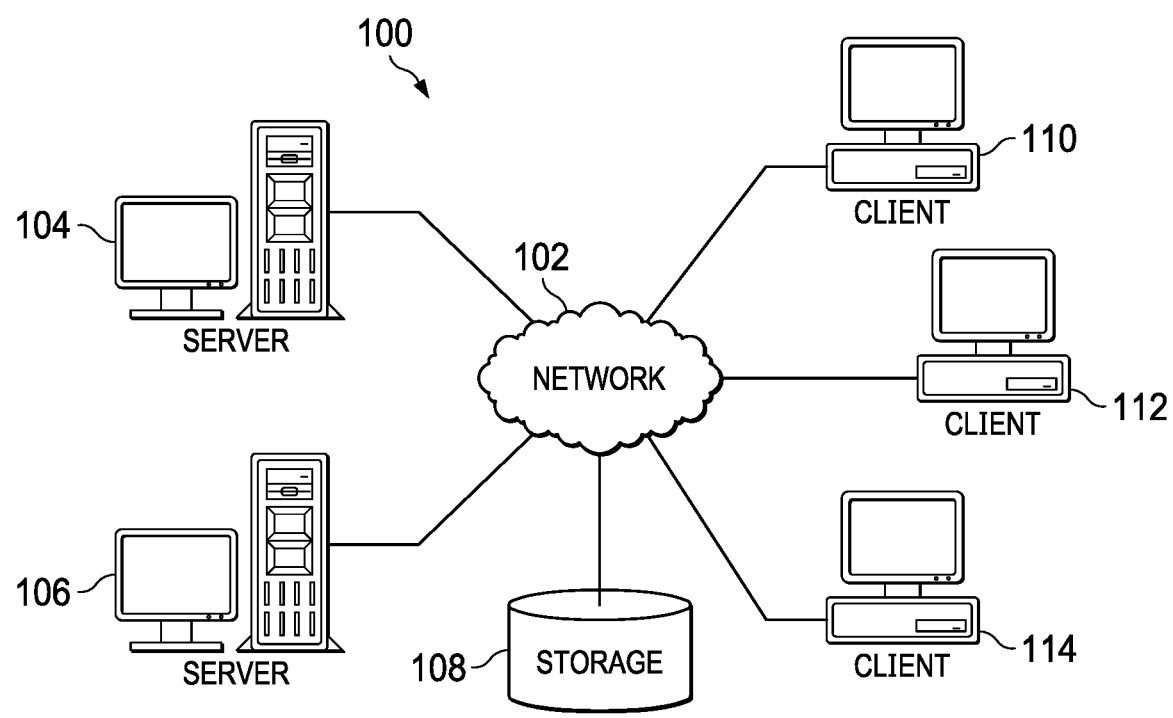
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
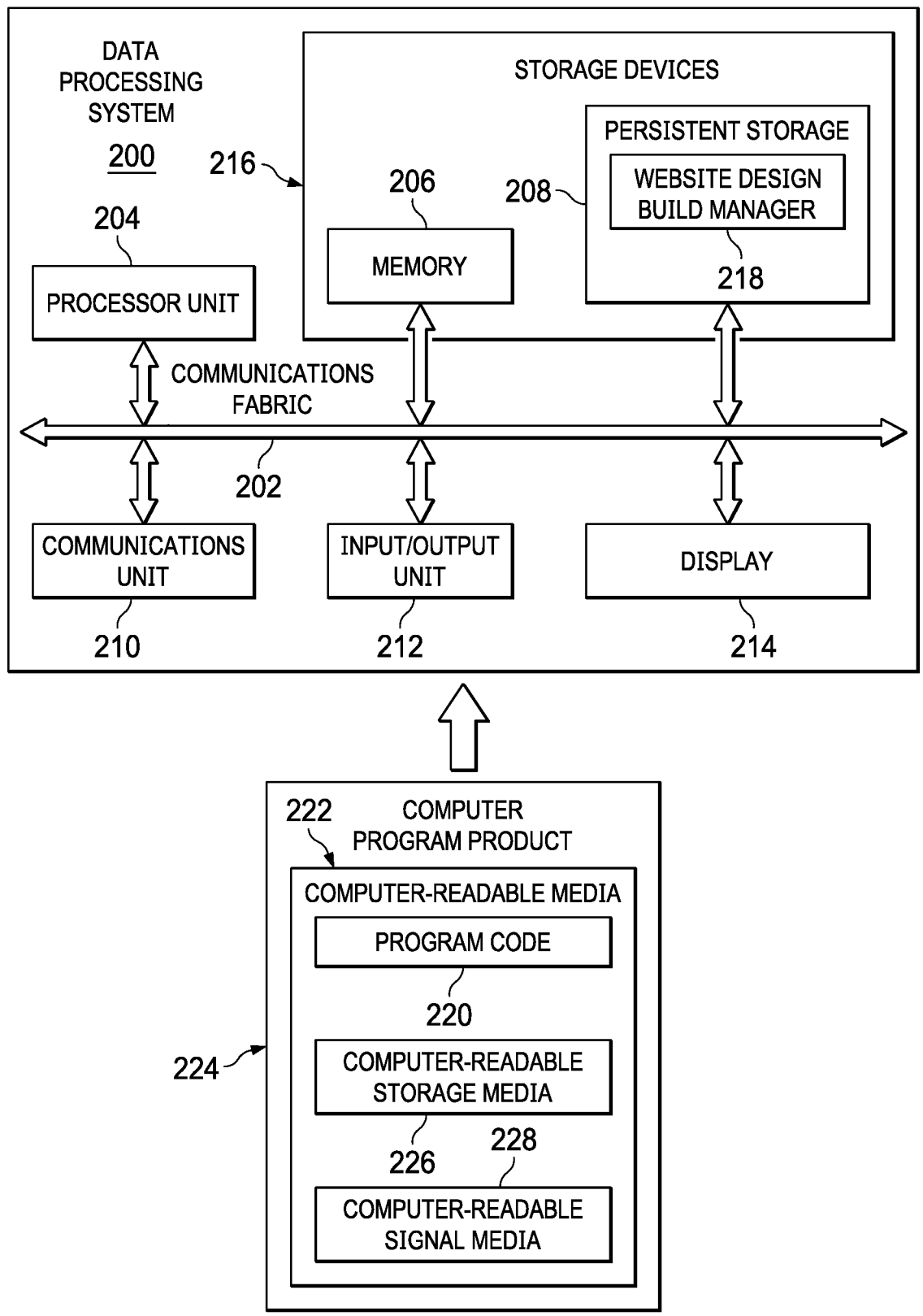
FIG. 2 is a diagram of a data processing system in which illustrative embodiments may be implemented.
Figure 3:
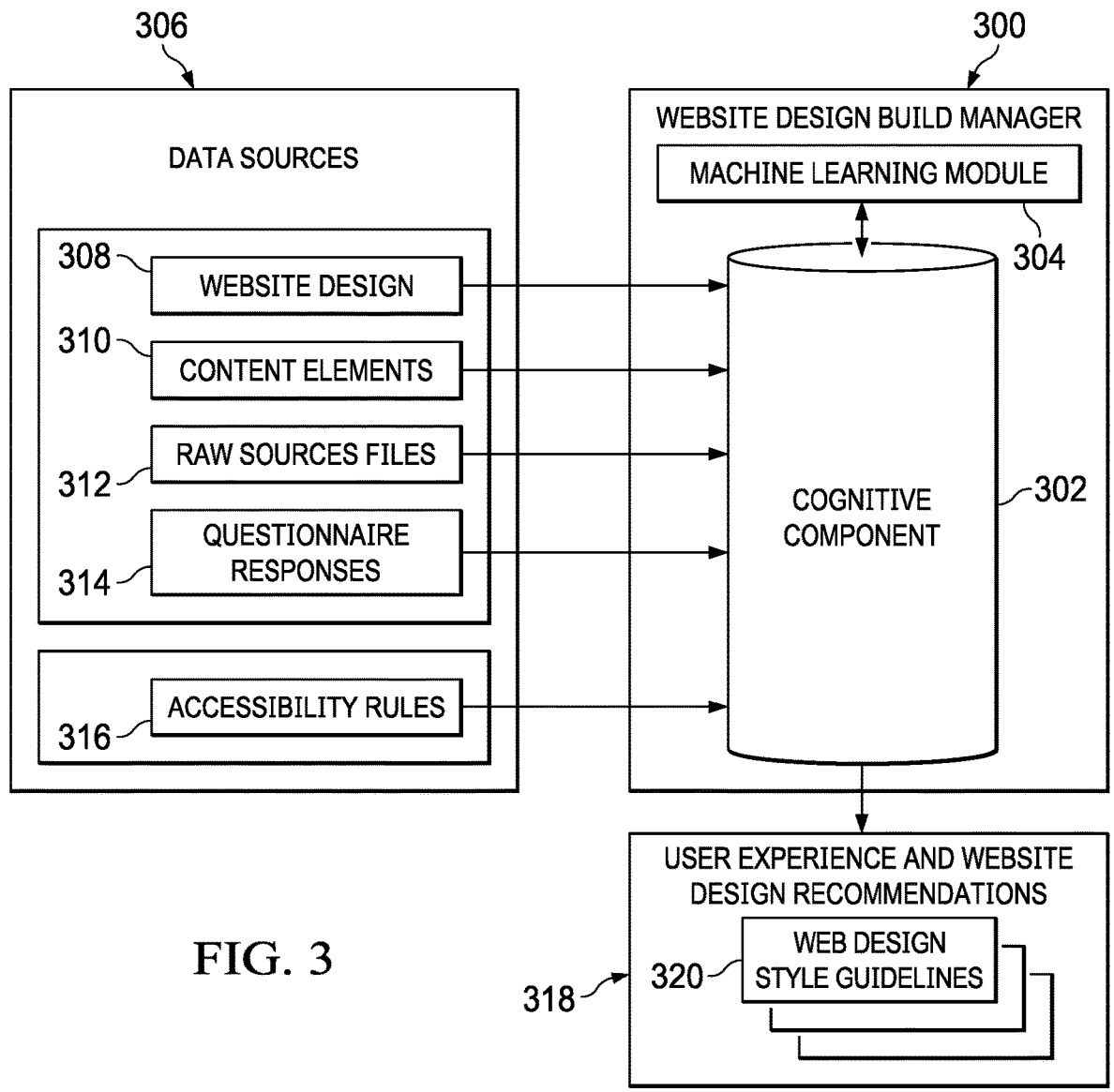
FIG. 3 is a diagram illustrating an example of a website design build manager in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide website design build management services to registered client devices. Server 104 and server 106 provide the website design build management services to registered client devices by automatically generating web design style guidelines for website design builds, checking the website design builds for compliance with accessibility guidelines, and recommending modifications and alternatives for the website design builds.

Also, it should be noted that server 104 and server 106 may each represent a cluster of servers in one or more data centers. Alternatively, server 104 and server 106 may each represent multiple computing nodes in one or more cloud environments. Further, server 104 and server 106 may provide information, such as, for example, software applications and programs, software updates, software fixes, files, data, and the like, to registered client devices.

Client 110, client 112, and client 114 also connect to network 102. Clients 110, 112, and 114 are registered clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Subscribing users, such as, for example, website designers and developers, of clients 110, 112, and 114 may utilize clients 110, 112, and 114 to access and utilize the website design build management services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of registered client devices, identifiers for a plurality of subscribing users, existing best practices web design style guideline template examples, examples of common content element patterns in website design builds, raw design files, historical responses to questionnaires by website designers and developers, website accessibility guidelines, and the like. Furthermore, storage 108 may store other types of data, such as authentication or credential data that may include user names, passwords, and biometric data associated with website designers and developers, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the website design build management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores website design build manager 218. However, it should be noted that even though website design build manager 218 is illustrated as residing in persistent storage 208, in an alternative illustrative embodiment website design build manager 218 may be a separate component of data processing system 200. For example, website design build manager 218 may be a hardware component coupled to communication fabric 202 or a combination of hardware and software components. In another alternative illustrative embodiment, a first set of components of website design build manager 218 may be located in data processing system 200 and a second set of components of website design build manager 218 may be located in a second data processing system, such as, for example, server 106 in FIG. 1.

Website design build manager 218 controls the process of automatically generating web design style guidelines for a specified website design build based on identifying style guide patterns in existing web design style guideline template examples, generating a recommendation to implement those web design style guidelines in the specified website design build, determining whether any gaps or accessibility compliance issues exist in the website design build, and automatically resolving any determined gaps or accessibility compliance issues. As a result, data processing system 200 operates as a special purpose computer system in which website design build manager 218 in data processing system 200 enables automatic generation and implementation of a set of web design style guidelines in a web design build. In particular, website design build manager 218 transforms data processing system 200 into a special purpose computer system as compared to currently available general computer systems that do not have website design build manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

For the user experience designer and user interface designer, there is an increased demand to create web design style guidelines based on web design output. Typically, web design style guidelines are created manually by user experience designers and user interface designers after a website design build project has been completed and, therefore, may be rushed to be created. However, an ability to automatically create web design style guidelines for designers and developers without human intervention would be a great benefit by decreasing cost and time required for website design builds. Web design style guidelines should be scoped as an independent project and should not be treated as an add on to an existing website build project. Too often the web design style guidelines are not given the priority they deserve and are rushed to be completed by deadlines not set to accommodate such an extensive, detailed deliverable.

Illustrative embodiments utilize a cognitive component to automatically analyze and generate web design style guidelines for a website design build based on website design inputs, such as, for example, layout, graphics, copy, pages, raw design files (e.g., Sketch, Adobe, and the like), user accessibility considerations, designer/developer input (e.g., questionnaire responses), and more. Illustrative embodiments may leverage a design system, such as, for example, Carbon Design System, when appropriate to generate recommendations for website design build projects. A design system is a series of individual styles, content elements, and guidelines used for creating a unified user experience. Entities, such as, for example, businesses and companies, that have an online presence should also provide website accessibility for disabled users. Not only are there ethical and commercial justifications for implementing the Web Content Accessibility Guidelines, but in some countries and jurisdictions, there are also legal reasons for compliance with the Guidelines. The Web Content Accessibility Guidelines are part of a series of web accessibility guidelines published by the Web Accessibility Initiative of the World Wide Web Consortium, an international standards organization for the Internet. Web Content Accessibility Guidelines are a set of recommendations for making Web content more accessible, primarily for users with disabilities, but also for all users and limited devices, such as mobile phones.

Illustrative embodiments perform cognitive analysis of existing website design artifacts, which includes website wireframe, website user interface design, website build, website content elements, and the like. A website wireframe, also known as a page schematic or screen blueprint, is a visual guide representing the framework of a website. The wireframe is created for the purpose of arranging content elements of a website to best accomplish a particular purpose. The wireframe depicts the page layout or arrangement of the website's content, including interface and navigational elements, and how they work together. The wireframe usually lacks typographic style, color, or graphics, since the main focus lies in functionality, behavior, and priority of content.

The cognitive component of illustrative embodiments extracts all common website design and content elements, such as, for example, typography, color palette, icons, imagery, copy, graphics, white space, forms, spacing, buttons, and the like (i.e., if not already existing in aggregate form). The cognitive component also identifies common web design style guideline patterns and highlights any gaps in the website design build as questions for designers/developers to answer. A gap is an inconsistency, disparity, difference, or mismatch between an existing and a new website design build. For example, a gap may be a content element, such as a color or button, in the new website design build that is not in an existing best practices website design build template example.

In addition, the cognitive component scans website design assets and content elements for compliance with user accessibility standards and requirements. Further, the cognitive component interprets website copy and brand messaging to be applied as brand guidelines. The cognitive component identifies and codifies layout and template details for web design style guidelines.

The cognitive component utilizes best practice examples of successful web design style guidelines as templates or benchmarks for generating web design style guidelines. Furthermore, the cognitive component analyzes all website design inputs and determines what is missing for web design style guidelines. The cognitive component generates a designer/developer questionnaire for any determined gaps and accessibility compliance issues. Once all website design inputs are received and analyzed, the cognitive component generates a recommendation output of website design style guideline patterns for implementation in a website design build. For website design build purposes, the web development team or the cognitive component can specify specific types of guidelines to apply to the technology being used to build the website, such as, for example, Angular, React, and the like. For example, the web development team or the cognitive component can specify specific types of guidelines for screen level interactions, such as pop up tool tips, based on the technology supporting the website design build.

As an illustrative use case example, a web designer has been asked to create web design style guidelines for a new website design build project. The web designer uses the cognitive component of illustrative embodiments to generate the web design style guidelines because the web designer does not have sufficient time to create the guidelines.

As another illustrative use case example, a web development team has been on a website build project for two years and has created a wonderful website user experience for a large-scale client. The website deliverables and design are packaged and the website goes live. The web development team rolls off the website development project. No one on the client side has been assigned to maintain the website user experience. As a result, the client needs a set of web design style guidelines to maintain the website user experience. The client uses the cognitive component of illustrative embodiments to automatically assess and generate the web design style guidelines for the website based on the existing website assets.

As a further illustrative use case example, the user experience of a given website needs to be evaluated for accessibility issues and regulatory compliance. The cognitive component of illustrative embodiments performs a scan of the website and outputs a recommendation to, for example, update certain buttons that are green with light gray type to red with black type. Based on the recommendation, the designer or the cognitive component makes appropriate updates to those buttons on the website.

As yet another illustrative use case example, a developer needs a set of web design style guidelines that meets the developer's needs for coding purposes. The underlying style system (e.g., Cascading Style Sheets properties) and interactions are called out in the design system to meet the developer's implementation needs. The cognitive component of illustrative embodiments automatically generates the web design style guidelines based on a scan of the underlying website design.

Illustrative embodiments use the cognitive component to identify website content elements and automate generation of a website design library. A novel aspect of the cognitive component is identification of existing web design style guideline patterns, identification of website design and content elements, and automatic generation of the web design style guidelines for a particular website design build.

Illustrative embodiments automatically assemble and generate the web design style guidelines, check user accessibility compliance with Web Content Accessibility Guidelines, recommend alternatives, and customize output for website development purposes. For example, illustrative embodiments utilize a machine learning module to train the cognitive component to recognize and identify web design style guideline patterns based on reviewing existing web design style guidelines for content elements, such as buttons, copy, icons, navigation, and the like. The machine learning module also trains the cognitive component to identify font usage, copy usage, and other typical web design style guideline patterns. In addition, the machine learning module may learn and apply specific methodologies, such as, for example, atomic design principles, as well.

Further, illustrative embodiments utilize the machine learning module to train the cognitive component to differentiate between best practices and worst practices of web design style guidelines based on analyzing one or more best practice web design style guideline template examples. Illustrative embodiments utilize best practice examples for machine learning purposes to demonstrate preferred approaches for output of recommended web design style guidelines. In addition, illustrative embodiments utilize worst (e.g., poor or failed) web design style guideline template examples to identify what not to emulate for the output of the web design style guideline recommendations. The cognitive component scans existing web design style guideline template examples of a preferred or specific type based on technology used for a particular website design build. Illustrative embodiments utilize existing web design style guidelines for specific areas of focus for machine learning purposes, which includes, for example, experience with client websites, website designs, brand guidelines, and the like.

Furthermore, illustrative embodiments utilize the machine learning module to train the cognitive component to differentiate between accessible and inaccessible website content elements from a success or fail perspective. Illustrative embodiments base accessibility compliance on current Web Content Accessibility Guidelines. The machine learning module trains the cognitive component to identify which website content elements are compliant with the accessibility guideline and which website content elements are not compliant so that the cognitive component can then recommend alternatives for website content elements. Recommendations for compliant website content element alternatives are based on existing web design style guidelines or brand design patterns. The cognitive component presents recommendations for the website content element alternatives to the web development team for implementation and may use the recommendations as a basis for additional machine learning opportunities for a specific website design build.

Moreover, illustrative embodiments utilize the cognitive component to scan the website design, including website wireframe, website user interface design, website build, website copy (i.e., text), and the like. Assessment of the website design by the cognitive component would highlight any gaps or inconsistencies in the website design build, which may include, for example, inconsistencies in color treatments, copy tone, call to action copy, button positioning on the screen, and the like. The cognitive component would highlight these gaps and make recommendations for corrective actions. However, it should be noted that the cognitive component may automatically perform one or more of the corrective actions to implement recommended changes to the website design build. The web development team can dismiss recommendations, select recommendations, or provide updates or alternatives to the recommendations. The cognitive component inputs the recommendations and any updates to the recommendations into the machine learning module for ongoing machine learning.

In addition, illustrative embodiments utilize the cognitive component to automatically generate the website design recommendations without human intervention and to automatically learn from designer input and adjustments to outputted recommendations. The cognitive component determines the recommendations for the website design based on best practice website design template examples.

The cognitive component also captures website design history and ongoing usage of the website design. For example, the cognitive component provides historical logs of all website design actions and activities. This historical information provides a framework for forecasting maintenance and updates to the website design. The cognitive component automatically updates and maintains the website design as website changes are made over time.

Thus, illustrative embodiments provide one or more technical solutions that overcome a technical problem with automatically generating web design style guidelines for websites without human intervention. As a result, these one or more technical solutions provide a technical effect and practical application in the field of websites.

With reference now to FIG. 3, a diagram illustrating an example of a website design build manager is depicted in accordance with an illustrative embodiment. Website design build manager 300 may be implemented in a computer, such as, for example, server 104 in FIG. 1 or data processing system 200 in FIG. 2. Web site design build manager 300 may be, for example, website design build manager 218 in FIG. 2.

In this example, website design build manager 300 includes cognitive component 302. Cognitive component 302 may include, for example, artificial intelligence that has intelligent behavior and can be based on the function of a human brain. Cognitive component 302 comprises at least one of an artificial neural network, cognitive system, Bayesian network, fuzzy logic, expert system, natural language processing, and the like. Website design build manager 300 utilizes machine learning module 304 to train cognitive component 302. Machine learning involves inputting data to the process and allowing the process to adjust and improve the predictive accuracy and function of cognitive component 302 over time, thereby increasing the performance of the computer, itself.

Machine learning module 304 can learn without being explicitly programmed to do so. Machine learning module 304 can learn based on training data input into machine learning module 304. Machine learning module 304 can learn using various types of machine learning algorithms. The various types of machine learning algorithms include at least one of supervised learning, semi-supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using historical web design style guideline data, for example.

Website design build manager 300 utilizes machine learning module 304 to train cognitive component 302 to identify web design style guideline patterns based on existing web design style guidelines for content elements, font usage, copy usage, and other web design style guideline patterns. In addition, website design build manager 300 utilizes machine learning module 304 to train cognitive component 302 to identify best practices of web design style guidelines based on best practice web design style guideline template examples. Web site design build manager 300 further utilizes machine learning module 304 to train cognitive component 302 to identify whether website content elements are compliant with accessibility guidelines.

Upon receiving a request to analyze a given website design build from a website designer/developer, cognitive component 302 retrieves website design inputs corresponding to that website design build from data sources 306. Data sources 306 represent a plurality of different website design information sources. In this example, data sources 306 include website design 308, content elements 310, raw source files 312, questionnaire responses 314, and accessibility rules 316. However, it should be noted that data sources 306 are meant as examples only and not as limitations on alternative illustrative embodiments. In other words, data sources 306 may include more or fewer sources of information than illustrated.

Website design 308 includes information regarding an overall design of a website design build, such as, for example, website wireframe, website user interface design, and the like. Content elements 310 include information regarding features or attributes of the website design build, such as, for example, typography, color palette, icons, imagery, copy, graphics, white space, forms, tables, fields, rows, spacing, tiles, buttons, navigation, and the like. Raw source files 312 include information in data files for web design user experience tools (e.g., Adobe XD, Sketch, and the like) corresponding to the website design build. Questionnaire responses 314 include any responses by a designer/developer to questions generated by cognitive component 302 regarding any gaps or accessibility compliance issues identified by cognitive component 302 in the website design build. Accessibility rules 316 include standards, such as, for example, Web Content Accessibility Guidelines and the like.

Cognitive component 302 utilizes all of the information retrieved from data sources 306 to automatically generate user experience and website design recommendations 318 for the web design build. Cognitive component 302 incorporates user experience and website design recommendations 318 in web design style guidelines 320 for implementation in the website design build. Furthermore, cognitive component 302 may automatically implement within the website design build one or more of user experience and website design recommendations 318 of web design style guidelines 320. Cognitive component 302 also sends web design style guidelines 320 to the web development team for review and possible modification. Moreover, cognitive component 302 inputs web design style guidelines 320 and any modifications to web design style guidelines 320 made by the web development team into machine learning module 304 for continued learning.

Figure 4:
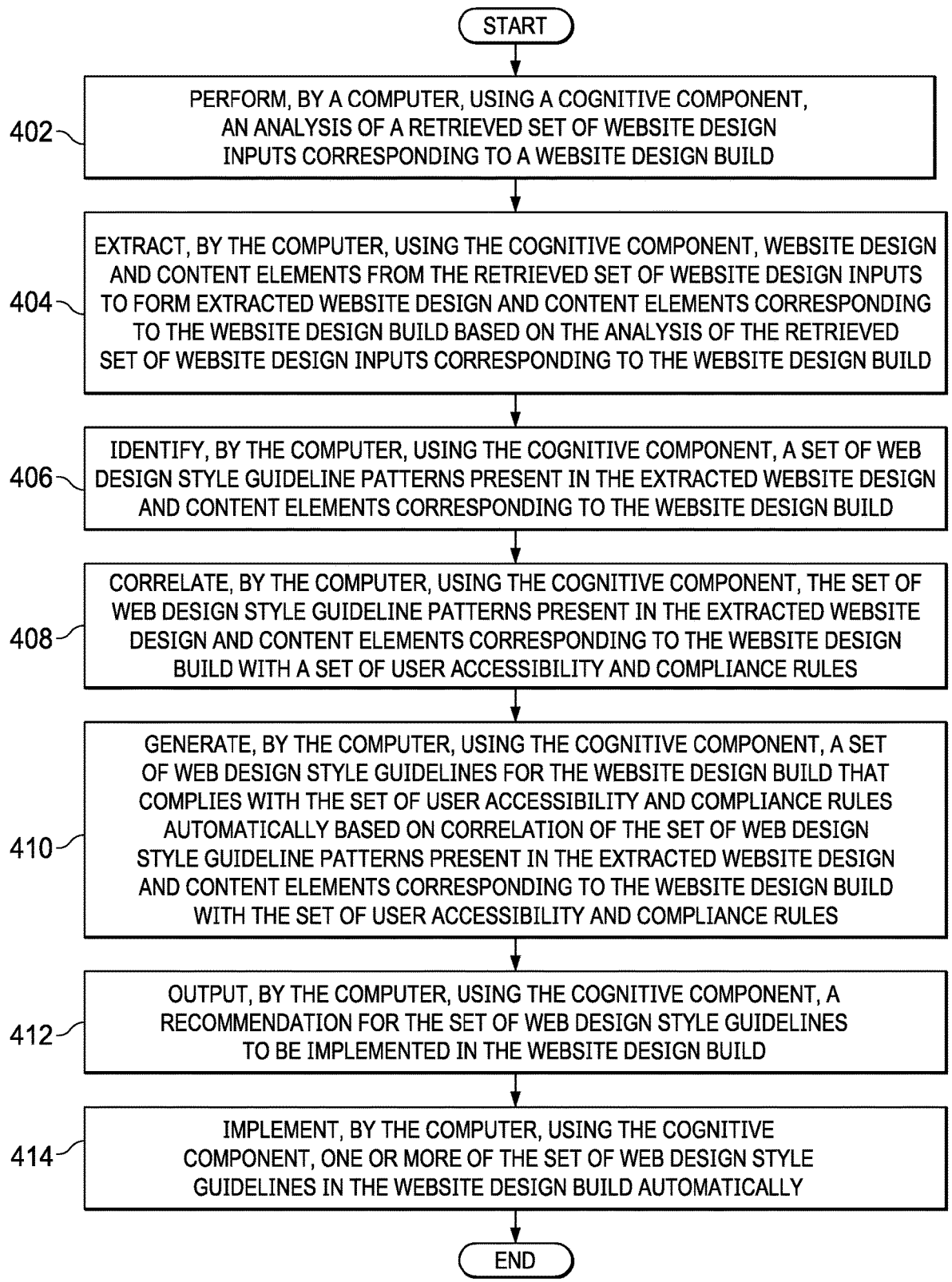
FIG. 4 is a flowchart illustrating a process for automatically generating a set of web design style guidelines in accordance with an illustrative embodiment.

With reference now to FIG. 4, a flowchart illustrating a process for automatically generating a set of web design style guidelines is shown in accordance with an illustrative embodiment. The process shown in FIG. 4 may be implemented in a computer, such as, for example, server 104 in FIG. 1 or data processing system 200 in FIG. 2. For example, the process shown in FIG. 4 may be implemented in website design build manager 218 in FIG. 2 or website design build manager 300 in FIG. 3.

The process begins when the computer, using a cognitive component, performs an analysis of a retrieved set of website design inputs corresponding to a website design build (step 402). The retrieved set of website design inputs may include, for example, existing website design artifacts, website wireframes, website user interface designs, website builds, website copy, and the like. The computer, using the cognitive component, extracts website design and content elements from the retrieved set of website design inputs to form extracted website design and content elements corresponding to the website design build based on the analysis of the retrieved set of website design inputs corresponding to the website design build (step 404).

The computer, using the cognitive component, identifies a set of web design style guideline patterns present in the extracted website design and content elements corresponding to the website design build (step 406). The computer, using the cognitive component, correlates the set of web design style guideline patterns present in the extracted website design and content elements corresponding to the website design build with a set of user accessibility and compliance rules (step 408). The set of user accessibility and compliance rules may be, for example, Web Content Accessibility Guidelines.

The computer, using the cognitive component, automatically generates a set of web design style guidelines for the website design build that complies with the set of user accessibility and compliance rules based on the correlation of the set of web design style guideline patterns present in the extracted website design and content elements corresponding to the website design build with the set of user accessibility and compliance rules (step 410). The computer, using the cognitive component, outputs a recommendation for the set of web design style guidelines to be implemented in the website design build (step 412). In addition, the computer, using the cognitive component, automatically implements one or more of the set of web design style guidelines in the website design build (step 414). Thereafter, the process terminates.

Figure 5B:
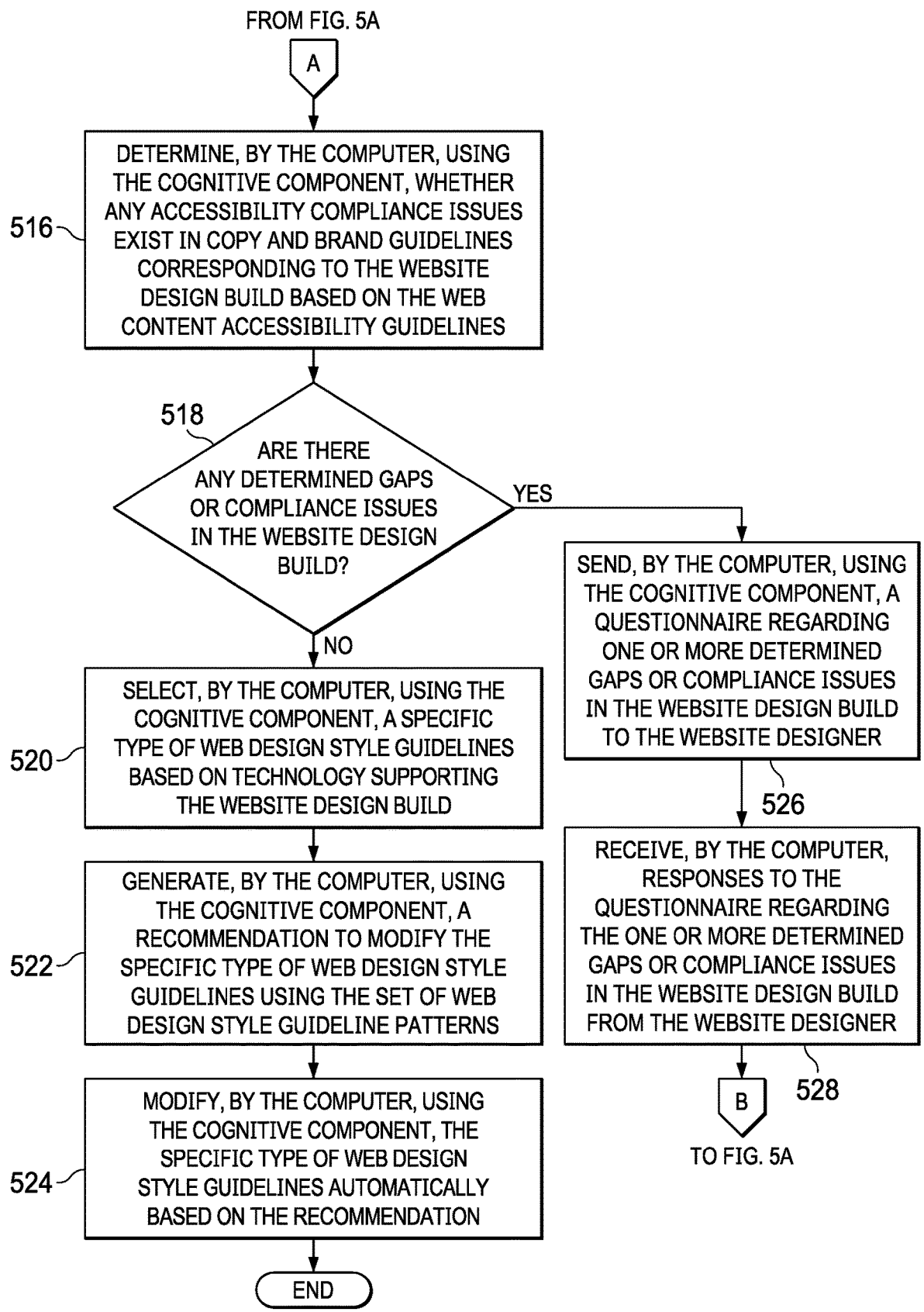

With reference now to FIGS. 5A-5B, a flowchart illustrating a process for generating a recommendation to modify a specific type of web design style guidelines is shown in accordance with an illustrative embodiment. The process shown in FIGS. 5A-5B may be implemented in a computer, such as, for example, server 104 in FIG. 1 or data processing system 200 in FIG. 2. For example, the process shown in FIGS. 5A-5B may be implemented in website design build manager 218 in FIG. 2 or website design build manager 300 in FIG. 3.

The process begins when the computer receives an input to analyze a website design build from a client device of a website designer via a network (step 502). In response to receiving the input, the computer retrieves a set of website design inputs corresponding to the website design build from a plurality of data sources via the network (step 504). The computer, using a cognitive component of the computer, analyzes the set of website design inputs corresponding to the website design build (step 506).

Afterward, the computer, using the cognitive component, extracts a set of website design and content elements from the set of website design inputs corresponding to the website design build based on the analysis (step 508). The computer, using the cognitive component, identifies a set of web design style guideline patterns in the set of website design and content elements (step 510).

In addition, the computer, using the cognitive component, determines whether any gaps exist in the website design build based on the set of web design style guideline patterns (step 512). Further, the computer, using the cognitive component, determines whether any accessibility compliance issues exist in the website design build based on Web Content Accessibility Guidelines (step 514). Furthermore, the computer, using the cognitive component, determines whether any accessibility compliance issues exist in copy and brand guidelines corresponding to the website design build based on the Web Content Accessibility Guidelines (step 516).

Subsequently, the computer, using the cognitive component, makes a determination as to whether there are any determined gaps or compliance issues in the website design build (step 518). If the computer, using the cognitive component, determines that there are no determined gaps or compliance issues in the website design build, no output of step 518, then the computer, using the cognitive component, selects a specific type of web design style guidelines based on technology supporting the website design build (step 520). The computer, using the cognitive component, also generates a recommendation to modify the specific type of web design style guidelines using the set of web design style guideline patterns (step 522). In addition, the computer, using the cognitive component, automatically modifies the specific type of web design style guidelines based on the recommendation (step 524). Thereafter, the process terminates.

Returning again to step 518, if the computer, using the cognitive component, determines that there are one or more determined gaps or compliance issues in the website design build, yes output of step 518, then the computer, using the cognitive component, sends a questionnaire regarding the one or more determined gaps or compliance issues in the website design build to the website designer (step 526). Afterward, the computer receives responses to the questionnaire regarding the one or more determined gaps or compliance issues in the website design build from the website designer (step 528). Thereafter, the process returns to step 506 where the computer, using the cognitive component, analyzes the set of website design inputs corresponding to the website design build, along with the responses to the questionnaire regarding the one or more determined gaps or compliance issues in the website design build received from the website designer.

Thus, illustrative embodiments of the present invention provide a computer-implemented method, computer system, and computer program product for automatically generating web design style guidelines for a specified website design build based on identified style guide patterns in existing best practice web design style guideline template examples and determined compliance with accessibility guidelines. Illustrative embodiments utilize a cognitive component to recommend the set of web design style guidelines to be implemented in the web design build. A machine learning module trains the cognitive component to understand and recognize the set of web design style guideline patterns based on existing web design style guidelines. The cognitive component also evaluates website design based on compliance with accessibility guidelines and standards. Illustrative embodiments capture website design history and ongoing website usages as inputs for machine learning, cognitive assessment, and recommendation output. The machine learning and cognitive assessment enable a level of pattern recognition and attention to detail that optimizes time and energy of designers, developers, and the website development team. This can be a continuous way to update websites with little cost and time over a period of time with machine learning and cognitive assessment capabilities in place. Thus, illustrative embodiments decrease cost and time associated with web design builds.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating web design style guidelines, the computer-implemented method comprising:

identifying, using a cognitive component of a website design build manager that comprises a machine learning module, a set of web design style guideline patterns present in extracted website design and content elements corresponding to a website design build;

correlating, using the cognitive component, i) the set of web design style guideline patterns present in the extracted website design and content elements corresponding to the website design build with ii) a set of accessibility rules;

generating, using the cognitive component, a set of web design style guidelines for the website design build automatically that complies with the set of accessibility rules based on correlation of i) the set of web design style guideline patterns present in the extracted website design and content elements corresponding to the website design build with ii) the set of accessibility rules; and outputting, using the cognitive component, a recommendation for the set of web design style guidelines to be implemented in the website design build.

2. The computer-implemented method of claim 1 further comprising:

implementing, using the cognitive component, one or more of the set of web design style guidelines in the website design build automatically.

3. The computer-implemented method of claim 1 further comprising:

performing, using the cognitive component, an analysis of a retrieved set of website design inputs corresponding to the website design build; and extracting, using the cognitive component, website design and content elements from the retrieved set of website design inputs to form the extracted website design and content elements corresponding to the website design build based on the analysis of the retrieved set of website design inputs corresponding to the website design build.

4. The computer-implemented method of claim 3 further comprising:

receiving an input to analyze the website design build from a client device of a website designer via a network; and retrieving a set of website design inputs corresponding to the website design build from a plurality of data sources via the network to form the retrieved set of website design inputs corresponding to the website design build.

5. The computer-implemented method of claim 1 further comprising:
  determining, using the cognitive component, whether any gaps exist in the website design build based on the set of web design style guideline patterns;
  determining, using the cognitive component, whether any accessibility compliance issues exist in the website design build based on the set of accessibility rules;
  determining, using the cognitive component, whether any accessibility compliance issues exist in copy and brand guidelines corresponding to the website design build based on the set of accessibility rules; and
  determining, using the cognitive component, whether there are any determined gaps or compliance issues in the website design build.

6. The computer-implemented method of claim 5 further comprising:
  responsive to determining that there are no determined gaps or compliance issues in the website design build, selecting, using the cognitive component, a specific type of web design style guidelines based on technology supporting the website design build;
  generating, using the cognitive component, a recommendation to modify the specific type of web design style guidelines using the set of web design style guideline patterns; and
  modifying, using the cognitive component, the specific type of web design style guidelines automatically based on the recommendation.

7. The computer-implemented method of claim 5 further comprising:
  responsive to determining that there are one or more determined gaps or compliance issues in the website design build, sending, using the cognitive component, a questionnaire regarding the one or more determined gaps or compliance issues in the website design build to a website designer; and
  receiving responses to the questionnaire regarding the one or more determined gaps or compliance issues in the website design build from the website designer.

8. The computer-implemented method of claim 1, wherein the cognitive component is trained using the machine learning module to understand and recognize the set of web design style guideline patterns based on existing web design style guidelines.

9. The computer-implemented method of claim 1, wherein the cognitive component is trained using the machine learning module to differentiate between best practices and worst practices of web design style guidelines based on analyzing one or more best practice web design style guideline template examples.

10. A computer system for automatically generating web design style guidelines, the computer system comprising:
  a bus system;
  a storage device connected to the bus system, wherein the storage device stores program instructions; and
  a processor connected to the bus system, wherein the processor executes the program instructions to:
    identify, using a cognitive component of a website design build manager that comprises a machine learning module, a set of web design style guideline patterns present in extracted website design and content elements corresponding to a website design build;
    correlate, using the cognitive component, i the set of web design style guideline patterns present in the extracted website design and content elements corresponding to the website design build with ii) a set of accessibility rules;
    generate, using the cognitive component, a set of web design style guidelines for the website design build automatically that complies with the set of accessibility rules based on correlation of i) the set of web design style guideline patterns present in the extracted website design and content elements corresponding to the website design build with ii) the set of accessibility rules; and
    output, using the cognitive component, a recommendation for the set of web design style guidelines to be implemented in the website design build.

11. The computer system of claim 10, wherein the processor further executes the program instructions to:
  implement, using the cognitive component, one or more of the set of web design style guidelines in the website design build automatically.

12. The computer system of claim 10, wherein the processor further executes the program instructions to:
  perform, using the cognitive component, an analysis of a retrieved set of website design inputs corresponding to the website design build; and
  extract, using the cognitive component, website design and content elements from the retrieved set of website design inputs to form the extracted website design and content elements corresponding to the website design build based on the analysis of the retrieved set of website design inputs corresponding to the website design build.

13. The computer system of claim 12, wherein the processor further executes the program instructions to:
  receive an input to analyze the website design build from a client device of a website designer via a network; and
  retrieve a set of website design inputs corresponding to the website design build from a plurality of data sources via the network to form the retrieved set of website design inputs corresponding to the website design build.

14. A computer program product for automatically generating web design style guidelines, the computer program product comprising a computer readable storage medium having program instructions embodied therewith, the program instructions executable by a computer to cause the computer to perform a method of:
  identifying, using a cognitive component of a website design build manager that comprises a machine learning module, a set of web design style guideline patterns present in extracted website design and content elements corresponding to a website design build;
  correlating, using the cognitive component, i) the set of web design style guideline patterns present in the extracted website design and content elements corresponding to the website design build with ii) a set of accessibility rules;
  generating, using the cognitive component, a set of web design style guidelines for the website design build automatically that complies with the set of accessibility rules based on correlation of i) the set of web design style guideline patterns present in the extracted website design and content elements corresponding to the website design build with ii) the set of accessibility rules; and
  outputting, using the cognitive component, a recommendation for the set of web design style guidelines to be implemented in the website design build.

15. The computer program product of claim 14 further comprising:
  implementing, using the cognitive component, one or more of the set of web design style guidelines in the website design build automatically.

16. The computer program product of claim 14 further comprising:
  performing, using the cognitive component, an analysis of a retrieved set of website design inputs corresponding to the website design build; and
  extracting, using the cognitive component, website design and content elements from the retrieved set of website design inputs to form the extracted website design and content elements corresponding to the website design build based on the analysis of the retrieved set of website design inputs corresponding to the website design build.

17. The computer program product of claim 16 further comprising:
  receiving an input to analyze the website design build from a client device of a website designer via a network; and
  retrieving a set of website design inputs corresponding to the website design build from a plurality of data sources via the network to form the retrieved set of website design inputs corresponding to the website design build.

18. The computer program product of claim 14 further comprising:
  determining, using the cognitive component, whether any gaps exist in the website design build based on the set of web design style guideline patterns;
  determining, using the cognitive component, whether any accessibility compliance issues exist in the website design build based on the set of accessibility rules;
  determining, using the cognitive component, whether any accessibility compliance issues exist in copy and brand guidelines corresponding to the website design build based on the set of accessibility rules; and
  determining, using the cognitive component, whether there are any determined gaps or compliance issues in the website design build.

19. The computer program product of claim 18 further comprising:
  responsive to determining that there are no determined gaps or compliance issues in the website design build, selecting, using the cognitive component, a specific type of web design style guidelines based on technology supporting the website design build;
  generating, using the cognitive component, a recommendation to modify the specific type of web design style guidelines using the set of web design style guideline patterns; and
  modifying, using the cognitive component, the specific type of web design style guidelines automatically based on the recommendation.

20. The computer program product of claim 18 further comprising:
  responsive to determining that there are one or more determined gaps or compliance issues in the website design build, sending, using the cognitive component, a questionnaire regarding the one or more determined gaps or compliance issues in the website design build to a website designer; and
  receiving responses to the questionnaire regarding the one or more determined gaps or compliance issues in the website design build from the website designer.

* * * * *